United States Patent
Gourevitch et al.

(10) Patent No.: US 8,707,420 B2
(45) Date of Patent: Apr. 22, 2014

(54) TRUSTED E-MAIL COMMUNICATION IN A MULTI-TENANT ENVIRONMENT

(75) Inventors: Gregory Gourevitch, Redmond, WA (US); Victor William Habib Boctor, Redmond, WA (US); Wilbert De Graaf, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 325 days.

(21) Appl. No.: 12/785,348

(22) Filed: May 21, 2010

(65) Prior Publication Data

US 2011/0289581 A1    Nov. 24, 2011

(51) Int. Cl.
*H04L 29/06*    (2006.01)

(52) U.S. Cl.
USPC ...... 726/14; 726/3; 726/7; 709/206; 709/207; 370/392; 370/401

(58) Field of Classification Search
USPC ............. 726/3, 7, 14; 709/206, 207; 370/392, 370/401
See application file for complete search history.

(56) References Cited

U.S. PATENT DOCUMENTS

| | | | |
|---|---|---|---|
| 6,356,937 B1 | 3/2002 | Montville et al. | 709/206 |
| 7,249,175 B1 * | 7/2007 | Donaldson | 709/225 |
| 7,461,254 B1 | 12/2008 | Rubin | 713/170 |
| 7,660,989 B2 | 2/2010 | Tomkow | 713/170 |
| 8,060,746 B2 * | 11/2011 | Kojima | 713/175 |
| 2002/0099681 A1 | 7/2002 | Gainey et al. | |
| 2004/0088359 A1 | 5/2004 | Simpson | |
| 2004/0181581 A1 | 9/2004 | Kosco | 709/206 |
| 2005/0102366 A1 * | 5/2005 | Kirsch | 709/207 |
| 2006/0048210 A1 | 3/2006 | Hildre et al. | |
| 2006/0121880 A1 | 6/2006 | Cowsar et al. | |
| 2006/0230461 A1 | 10/2006 | Hauser | 726/27 |
| 2007/0136801 A1 * | 6/2007 | Le et al. | 726/10 |
| 2007/0244974 A1 * | 10/2007 | Chasin | 709/206 |
| 2008/0201767 A1 | 8/2008 | Williams et al. | 726/6 |
| 2008/0307226 A1 | 12/2008 | Chow et al. | 713/175 |
| 2010/0274856 A1 * | 10/2010 | Bhadriraju et al. | 709/206 |
| 2011/0040974 A1 * | 2/2011 | Kaplan | 713/176 |
| 2011/0202756 A1 * | 8/2011 | West | 713/152 |

OTHER PUBLICATIONS

Crocker, D.; "*Internet Mail Architecture*"; Brandenburg InternetWorking; The Internet Society (2005); Feb. 2005; 21 pgs.
McKenna, G.; "*Operations Manager 2007 Advanced Architecture for Service Providers—Part 1*"; Drakz Free Online Service; Feb. 25, 2010; 6 pgs.
Bishop, M.; "*Recent Changes to Privacy Enhanced Electronic Mail*"; Department of Mathmatics and Computer Science, Dartmouth College; Journal of Internetworking: Research and Experience; Mar. 1993; 16 pgs.

* cited by examiner

*Primary Examiner* — Brandon Hoffman
*Assistant Examiner* — Hee Song
(74) *Attorney, Agent, or Firm* — Louise Bowman; Jim Ross; Micky Minhas

(57) ABSTRACT

Trusted e-mail communication may be provided. A message source organization may be validated. When a message is received from the validated message source organization for a recipient organization, a determination may be made as to whether the recipient organization supports an attribution data extension. If so, the message may be transmitted to the recipient organization with an attribution element associated with the message source organization.

20 Claims, 4 Drawing Sheets

TRUSTED E-MAIL COMMUNICATION IN A MULTI-TENANT ENVIRONMENT

BACKGROUND

Trusted e-mail communication in a multi-tenant environment is a process for authenticating messages received from multi-tenant systems. In some situations, an organization may receive e-mails from multiple other organizations. The organization may wish to apply certain message handling rules to messages authenticated as being from specific other organizations, but subject other messages to different rules. Conventional e-mail systems may employs certificate-based authentication and/or IP-address-based authentication to establish a trusted communication channel with another organization's e-mail system. These techniques, however, may only be useful when both sides of the trusted channel host their own e-mail systems on their premises. When either party (or both parties) uses an e-mail service hosted by a service provider, the provider's certificate and IP addresses may be shared between all customers of that service provider and may not be sufficient to establish a trusted communication channel with a specific customer of the service provider (aka tenant).

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Trusted e-mail communication may be provided. A message source organization may be validated. When a message is received from the validated message source organization for a recipient organization, a determination may be made as to whether the recipient organization supports an attribution data extension. If so, the message may be transmitted to the recipient organization with an attribution element associated with the message source organization.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
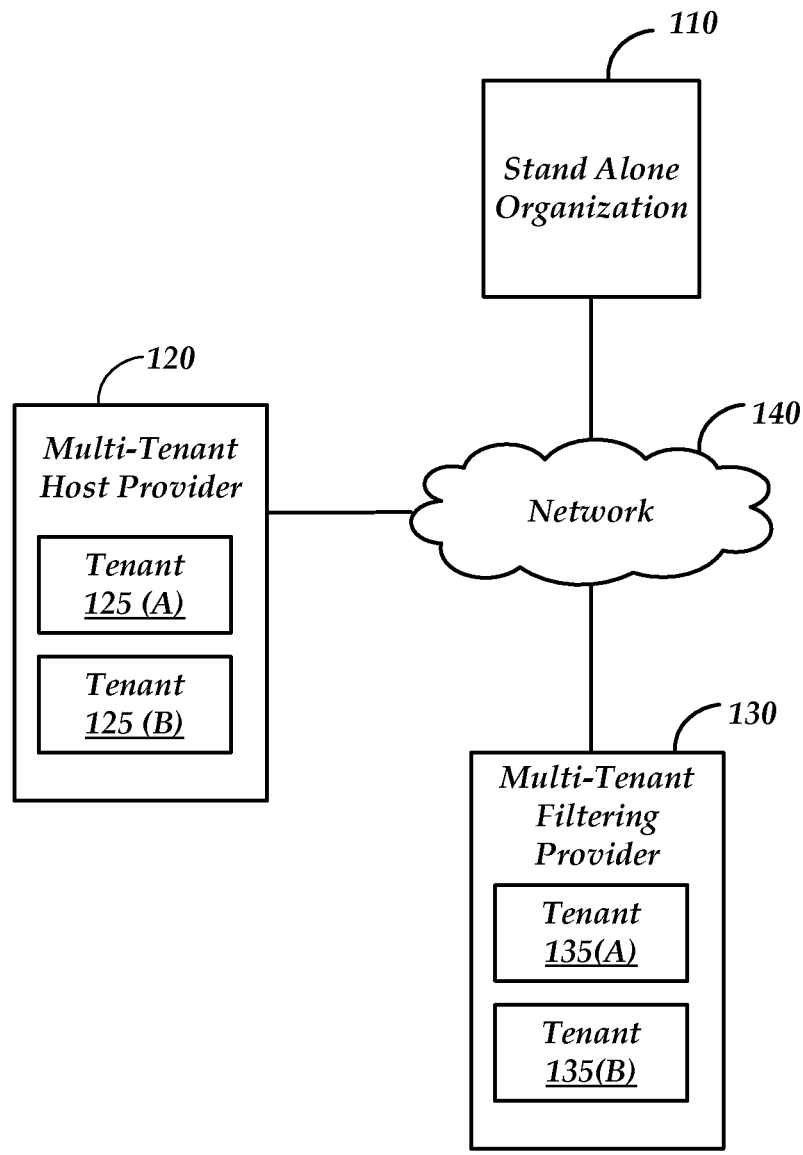
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Trusted e-mail communication in a multi-tenant environment may be provided. Consistent with embodiments of the present invention, an e-mail system that receives e-mail messages from a multi-tenant e-mail system may attribute received messages with specific tenants of the multi-tenant system. This attribution may allow the receiving system to execute different message handling rules than that executed for non-attributed messages. For example, extra capabilities, display options, and/or the ability to bypass filtering steps may be granted to messages associated with the specific tenant(s). The term "stand-alone system" may refer to an e-mail system deployed on premises of a first party. The term "multi-tenant system" may refer to e-mail systems and/or services hosted by an e-mail service provider and used by a second party. The term "tenant" may refer to a representation of the second party in the multi-tenant system.

FIG. 1 is a block diagram of an operating environment 100 for providing trusted e-mail communication. Operating environment may comprise a stand-alone organization 110, a multi-tenant e-mail hosting provider 120 comprising a plurality of e-mail hosting tenants 125(A)-(B), and a multi-tenant e-mail filtering provider 130 comprising a plurality of e-mail filtering tenants 135(A)-(B). Each of stand-alone organization 110, multi-tenant e-mail hosting provider 120, and/or multi-tenant e-mail filtering provider 130 may comprise at least one message transfer agent, not shown. Stand-alone organization 110, multi-tenant e-mail hosting provider 120, and/or multi-tenant e-mail filtering provider 130 may intercommunicate via a network 140, such as a local area network, a cellular data network, and/or a public network such as the Internet. Multi-tenant e-mail hosting provider 120 may comprise a service provider operative to provide both e-mail sending/receiving functionality and memory storage operative to store e-mails associated with plurality of e-mail hosting tenants 125(A)-(B). Multi-tenant e-mail filtering provider 130 may comprise a mail relay operative to receive e-mail messages from and/or deliver e-mail messages to plurality of e-mail filtering tenants 135(A)-(B) after processing the e-mail messages according to at least one message handling rule. For example, multi-tenant e-mail filtering provider 130 may perform anti-virus scans and/or spam filtering on relayed e-mail messages. Multi-tenant e-mail hosting provider 120 and/or multi-tenant e-mail filtering provider 130 may be referred to throughout as "multi-tenant system(s)", and e-mail hosting tenants 125(A)-(B) and/or e-mail filtering tenants 135(A)-(B) may be referred to throughout as "tenants". E-mail filtering tenants 135 (A)-(B) may be operative to provide some mail processing functionality as is used by stand-alone organization 110, such as receiving, sending, and delivering messages to recipients associated with the subscribing organization of e-mail filtering tenants 135 (A)-(B). For example, the subscribing organization of e-mail filtering tenant 135 (A) may be operable to send, receive, and store messages without assistance from multi-tenant e-mail filtering provider 130, but may choose to relay incoming and/or outgoing messages through multi-tenant e-mail filtering provider 130 to receive access to additional services, such as anti-virus scanning.

A message transfer agent (MTA) may comprise a computer process and/or software agent that may transfers electronic mail messages (e-mails) from one computer to another, in single and/or multiple hop application-level transactions. An MTA may implement both client (sending) and server (receiving) portions of the Simple Mail Transfer Protocol (SMTP). SMTP is an Internet standard for e-mail transmission across Internet Protocol (IP) networks, such as network 140. SMTP is defined in RFC RFC 5321 (2008), which includes extended SMTP (ESMTP) additions. Components of operating environment 100 may communicate using commands associated with SMTP. For example, prior to exchanging e-mail messages, multi-tenant hosting provider 120 may send an "EHLO" command to stand-alone organization 110 via SMTP. Stand-alone organization 110 may reply with a list of supported SMTP extensions, such as "DSN," "STARTTLS," and/or "SIZE". Consistent with embodiments of the invention, stand-alone organization 110 may indicate in the reply that it supports an attribution data element extension, such as by including an extension name of "XOORG" in the list of supported extensions.

Secure communication channels to a specific tenant may be desired among stand-alone organization 110, multi-tenant e-mail hosting provider 120, and/or multi-tenant e-mail filtering provider 130. For example, stand-alone organization 110 may need to communicate securely with e-mail hosting tenant 125(A). Stand-alone organization 110 may need to be able to distinguish messages coming from e-mail hosting tenant 125(A) from messages coming from e-mail hosting tenant 125(B) even if e-mail hosting tenant 125(B) attempts to impersonate e-mail hosting tenant 125(A) by spoofing envelope and/or message content properties. In a similar example, e-mail filtering tenant 135(A) may need to communicate securely with e-mail hosting tenant 125(A), in which case both sides of the communications may need to be tenant-specific.

By establishing a secure communication channel to a specific tenant, some policies may be applied and/or some restrictions may be bypassed that may be imposed on messages not received through that channel. For example, anti-spam filtering may be bypassed, distinctive formatting/rendering in an e-mail client program may be based on certain message properties (e.g. cross-premises mail that looks internal based on specific message headers), the ability to e-mail recipients and groups that may be configured to not accept mail from the Internet may be granted, message and/or attachment size restrictions may be relaxed, different attachment types may be allowed, etc.

Figure 2:
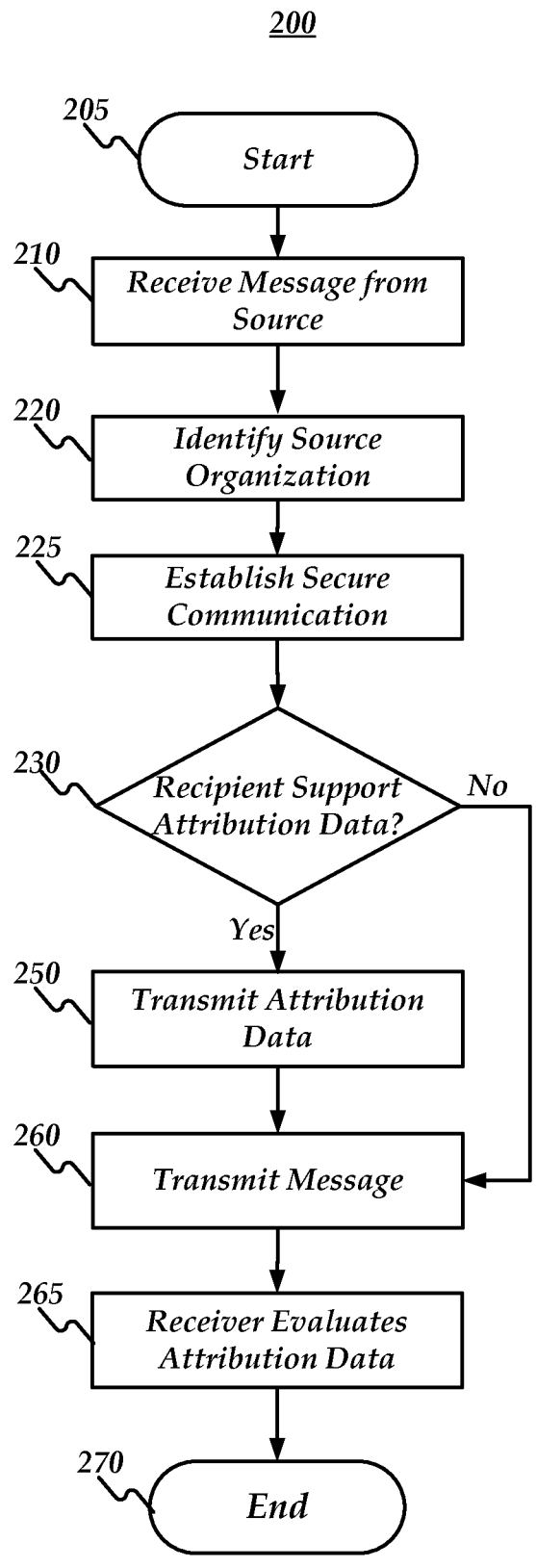
FIG. 2 is a flow chart of a method for providing message source validation and attribution.

FIG. 2 is a flow chart setting forth the general stages involved in a method 200 consistent with embodiments of the invention for providing message source validation and attribution. Method 200 may be implemented using a computing device 400 as described in more detail below with respect to FIG. 4. Ways to implement the stages of method 200 will be described in greater detail below. Method 200 may begin at starting block 205 and proceed to stage 210 where computing device 400 may receive a message from a source organization. For example, multi-tenant hosting provider 120 may receive a message from hosting tenant 125(A) for a recipient at stand-alone system 110

Method 200 may then advance to stage 220 where computing device 400 may identify a source organization. For example, multi-tenant host provider 120 may determine whether the message was received from a validated tenant. Consistent with embodiments of the invention, multi-tenant host provider 120 may also verify that the headers associated with the message correctly identify the source organization. Consistent with embodiments of the invention, the multi-tenant system may validate hosting tenants (e.g., hosting tenants 125(A)-B) and/or filtering tenants 135(A)-(B)), such as by requiring verifiable changes be made to domain ownership records by organizations seeking to host their e-mail communications associated with a given domain at multi-tenant host provider 120 and/or utilize services provided by multi-tenant e-mail filtering provider 130.

When a multi-tenant system first communicates with a new tenant, the system may perform a domain validation of the new tenant. This may be done once when the new tenant signs up for service. Identification of a tenant associated with the message being received for delivery may be performed for each received message. The identification may be accomplished, for example, by a username/password authentication of the message sender. Once the sender's tenant is identified, the domain (validated at sign-up) may be used as the attribution data for the message.

Method 200 may then advance to stage 225 where computing device 400 may establish a secure communication channel with a recipient organization. For example, multi-tenant hosting provider 120 performs an authentication with stand-alone organization 110. Authentication between stand-alone organization 110 and multitenant host provider 120 may be achieved using Transport Layer Security (TLS) and a certificate-based mutual authentication. Other implementations, such as physically secured dedicated lines, may be used as well.

Transport Layer Security (TLS) comprises a cryptographic protocol that provides security for communications over networks such as the Internet. TLS encrypts the segments of network connections at the Transport Layer end-to-end. The TLS protocol may allow client/server applications to communicate across a network in a way designed to prevent eavesdropping and tampering. In a bilateral connection mode consistent with embodiments of the invention, TLS may be used to perform mutual authentication. Mutual authentication requires that each side of a communication comprise a certificate, such as an X.509 certificate, defining required fields and data formats.

From stage 225, method 200 may advance to stage 230 where computing device 400 may determine whether the recipient supports attribution data. For example, an SMTP extension called XOORG may be advertised by the recipient system as a part of the EHLO command response. This may be done in response to an EHLO command following a STARTTLS command and/or in response to a first EHLO command. The XOORG advertisement may comprise a signal to the sending organization that a new parameter of the "MAIL FROM:" command, also called XOORG, may be used to send the identity of the organization on whose behalf a message is being sent. The identity may comprise a fully-qualified domain name. For example, stand-alone system 110 may respond with the XOORG extension when multi-tenant hosting provider 120 sends an EHLO SMTP command. Multi-tenant hosting provider 120 may then determine that stand-alone system 110 supports attribution data.

If the recipient does not support attribution data, method 200 may advance to stage 260 where computing device 400 may transmit the message without attribution data. For example, multi-tenant hosting provider 120 may transmit the message to stand-alone system 110 using SMTP over network 140. Method 200 may then end at stage 265.

If, at stage 230, the recipient is determined to support attribution data, method 200 may advance to stage 240 where computing device 400 may determine whether the source organization is trusted by the receiving organization. The receiving organization may be operative to provide the sending organization with a list of organizations from which it wants to receive attribution data. For example, stand-alone system 110 may inform multi-tenant hosting provider 120 that it trusts hosting tenant 125(A) but not tenant 125(B). If the source is not trusted, method 200 may advance to stage 260 where computing device 400 may transmit the message, as described above.

If the message is received from a source trusted by the recipient, method 200 may advance to stage 250 where computing device 400 may transmit attribution data associated with the source. The identity of each tenant may be reliably validated by the multi-tenant system during the provisioning process. Thus, the multi-tenant system may have a reliable way of attributing any message generated by any of its tenants to the actual tenant that generated the message and may be able to attribute messages received from stand-alone system 110 to its respective organization.

Consistent with embodiments of the invention, the multi-tenant system may also be operative to identify a sender of messages received by the multi-tenant system for delivery to one of its tenants. For example, the multi-tenant system may have sufficient data (e.g. a fully qualified domain name (FQDN) in a message source organization's certificate) to identify stand-alone system 110 and may reliably attribute incoming messages to the first party based on a securely authenticated communication channel.

To provide the attribution data associated with the sender to the recipient, computing device 400 may, for example, use an SMTP protocol extension. An XOORG command may be implemented within the SMTP framework and/or an XOORG parameter may be included in the existing "MAIL FROM:" command within the SMTP standard framework. The separate XOORG command may be used to transmit attribution data associated with multiple messages transmitted from a given source organization (e.g., a particular tenant from a multi-tenant system) during a single SMTP session while the XOORG parameter of the "MAIL FROM:" command may be varied for each message. The protocol extension may allow the receiving system to decide whether a message may be trusted before all the recipients and actual message data is received.

For another example, the attribution data may be added to the message itself and transmitted in a header such as "X-OriginatorOrganization". As with the SMTP extension, the value of the header may comprise the identity of the organization on whose behalf the message is being sent, and may comprise a fully-qualified domain name. The SMTP extension and the header are not mutually-exclusive and both may be provided. The data supplied in the protocol parameter may take precedence over the header value. If a discrepancy is detected by the receiving MTA, it may re-stamp the header to match the protocol parameter value.

From stage 250, method 200 may advance to stage 260 where computing device 400 may transmit the message as described above. Consistent with embodiments of the invention, the attribution data and message may be transmitted together, as where the attribution data is included in a message header as described with respect to stage 250. Method 200 may then end at stage 265.

Figure 3:
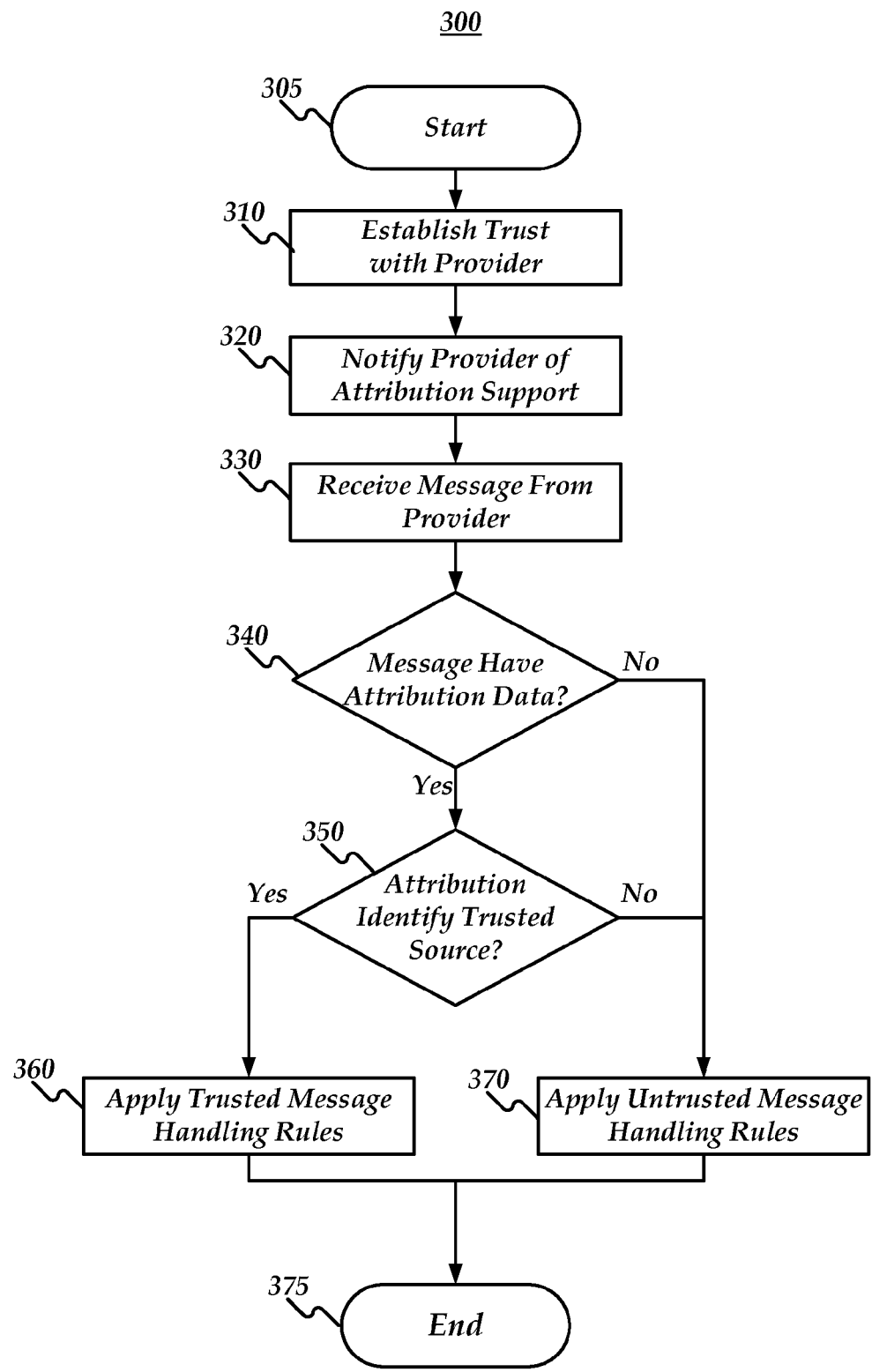
FIG. 3 is a flow chart of a method for providing trusted e-mail communication.

FIG. 3 is a flow chart setting forth the general stages involved in a method 300 consistent with embodiments of the invention for providing trusted e-mail communication. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may establish a trust relationship with another organization. For example, stand-alone system 110 may be configured to accept attribution data from a given multi-tenant system, such as multi-tenant hosting provider 120. Consistent with embodiments of the invention, attribution data may be accepted only from trusted organizations and may not be accepted from anyone who may attempt to establish a secure channel.

Method 300 may then advance to stage 320 where computing device 400 may notify message provider that it supports attribution data. For example, in response to an SMTP EHLO command from multi-tenant hosting provider 120, stand-alone system 110 may transmit an indicator that it supports the "XOORG" extension if multi-tenant hosting provider 120 is configured as a trusted system.

From stage 320, method 300 may advance to stage 330 where computing device 400 may receive a message from the trusted message provider. For example, multi-tenant hosting provider 120 may transmit an e-mail message from hosting tenant 125(A) to stand-alone system 110.

From stage 330, method 300 may advance to stage 340 where computing device 400 may determine whether the e-mail message is associated with attribution data. For example, stand-alone system 110 may determine whether XOORG data was received as part of the SMTP communication and/or as part of a message header, as described above with respect to stage 240 of method 200.

If, at stage 340, computing device 400 determines that the message is associated with attribution data, method 300 may advance to stage 350 where computing device 400 may determine whether the attribution data identifies a trusted source organization. For example, stand-alone system 110 may trust hosting tenant 125(A) but not hosting tenant 125(B). Stand-alone system 110 may examine the attribution data (e.g., a fully qualified domain name for the source organization using multi-tenant hosting system 120) and compare that data to an internally stored list of trusted organizations' domains.

If at stage 350, computing device 400 determines that the attribution data is associated with a trusted source, method 300 may advance to stage 360 where computing device 400 may apply a message handling rule associated with messages from trusted sources. For example, messages from trusted sources may bypass a spam filtering process, may be permitted larger attachment sizes and/or different attachment types, and/or may have appearance formatting applied. Consistent with embodiments of the invention, different trusted sources may be associated with different message handling rules. For example, messages from hosting tenant 125(A) and hosting tenant 125(B) may both be trusted, but only messages from hosting tenant 125(A) may be permitted to send attachments over 10 MB while both may be permitted to bypass a spam filter. Method 300 may then end at stage 375.

If the message is determined not to have attribution data at stage 340 and/or the attribution data is determined not to be associated with a trusted source at stage 350, method 300 may advance to stage 370 where untrusted and/or default message handling rules may be applied. For example, such messages may be processed by a spam filter and may be subject to different attachment restrictions than trusted messages. Method 300 may then end at stage 375.

When the recipient (e.g., stand-alone system 110) receives the attribution data parameter, it may check whether it is configured to trust the identified tenant. If the tenant is trusted, stand-alone system 110 may allow the message to bypass some of its policies applicable to anonymous messages. If the tenant is not configured as trusted, stand-alone system 110 may react, for example, in one of three ways: 1) accept the message and treat is as any message coming from an untrusted party, 2) temporarily reject the message with a 4XX response, or 3) permanently reject the message with a 5XX response. 4XX and 5xx responses may comprise error/notification messages in accordance with the SMTP standard. The temporary rejection may result in messages from untrusted "originator organizations" being queued for some time, which gives the administrators on both sides a chance to resolve the configuration issue and/or review the messages and deliver the queued messages without affecting the end-users.

An embodiment consistent with the invention may comprise a system for providing trusted e-mail communication. The system may comprise a memory storage and a processing unit coupled to the memory storage. The processing unit may be operative to validate a message source organization, receive a message from the validated message source organization for a recipient organization, determine whether the recipient organization supports an attribution data extension, and, if so, transmit the message to the recipient organization with an attribution element associated with the message source organization. The attribution element may be added to the message, such as in the message header, body, and/or as an attachment, regardless of whether the recipient organization is determined to support the attribution data extension. The recipient organization may then determine whether to accept, reject, ignore, and/or utilize the added attribution data.

Another embodiment consistent with the invention may comprise a system for providing trusted e-mail communication. The system may comprise a memory storage and a processing unit coupled to the memory storage. The processing unit may be operative to establish a trust relationship with a multi-tenant e-mail provider, notify the multi-tenant e-mail provider that an attribution element is supported, receive an e-mail message from a client tenant of the multi-tenant e-mail provider, and determine whether the e-mail message is associated with an attribution element. If the e-mail message is associated with the attribution element, the processing unit may be operative to determine whether the attribution element identifies the client tenant as a trusted sender, and, if so, apply an e-mail handling rule associated with e-mail messages received from trusted senders.

Yet another embodiment consistent with the invention may comprise a system for providing trusted e-mail communication. The system may comprise a memory storage and a processing unit coupled to the memory storage. The processing unit may be operative to create a validated communication channel with a source organization, receive an e-mail message from the source organization, determine whether the e-mail message is associated with an attribution data element, and, if so, determine whether the attribution data element identifies a trusted source organization. If the attribution data element identifies a trusted source organization, the processing unit may be operative to apply at least one first message handling rule prior to delivering the e-mail message. If the attribution data element does not identify a trusted source organization, the processing unit may be operative to apply at least one second message handling rule prior to delivering the e-mail message.

Figure 4:
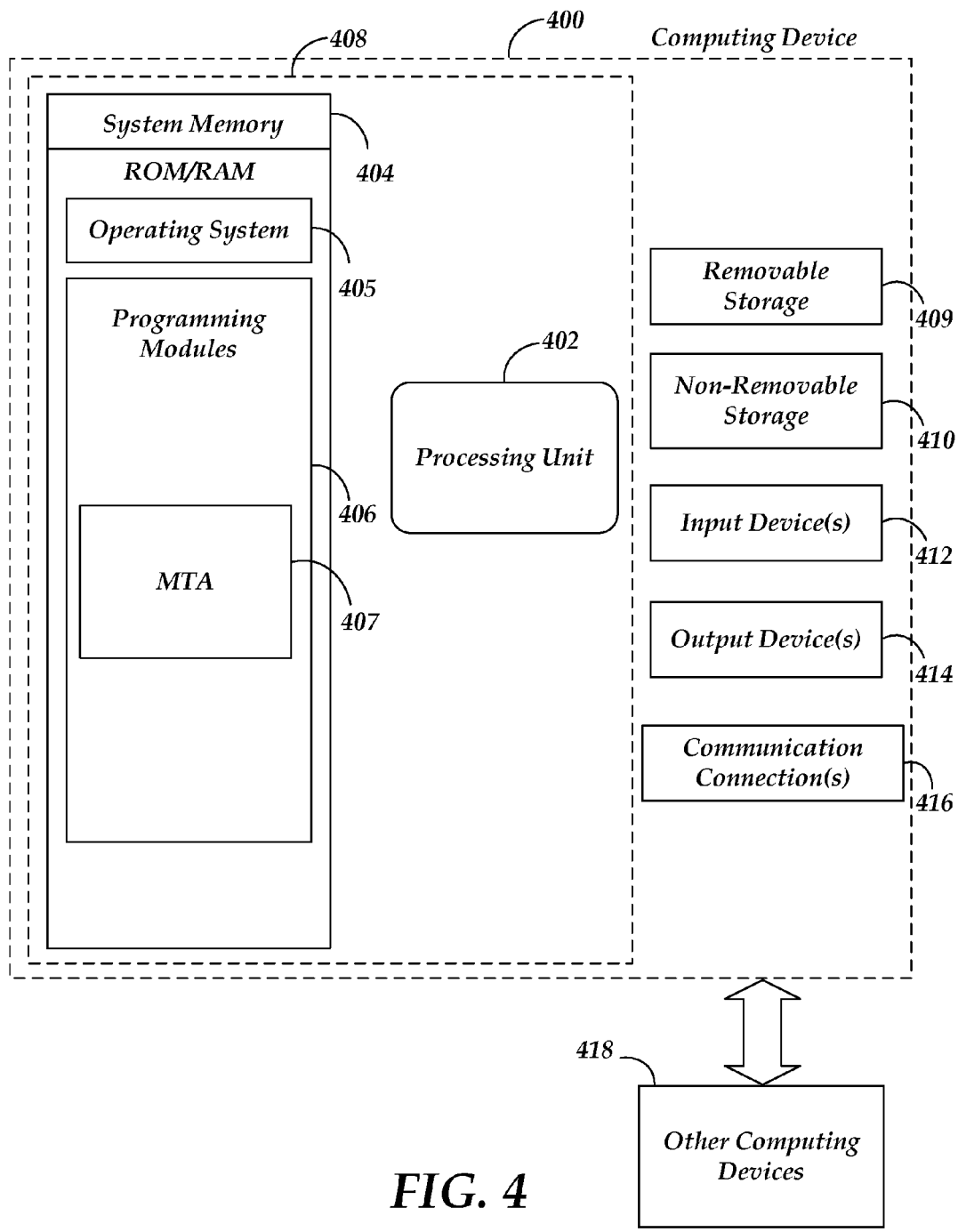
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a message transport agent (MTA) 407. Operating system 405, for example, may be suitable for controlling computing device 400's operation. Embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g. MTA 407) may perform processes including, for example, one or more of method 200's and/or method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing trusted e-mail communication, the method comprising:
   receiving a message from a message source organization for a recipient organization;

identifying the message source organization;
determining whether the message source organization is trusted;
determining whether the recipient organization supports an attribution data extension, including determining whether the recipient organization advertises support of the attribution data extension in response to an EHLO command transmitted via Simple Message Transport Protocol (SMTP); and
in response to determining that the recipient organization supports the attribution data extension, transmitting the message to the recipient organization with an attribution element indicating the message is authored by the trusted message source organization.

2. The method of claim 1, wherein the message source organization comprises a tenant organization of a multi-tenant e-mail service provider.

3. The method of claim 1, wherein the message source organization comprises a stand alone system and the recipient organization comprises a tenant of a multi-tenant e-mail service provider.

4. The method of claim 3, further comprising establishing a secure communication channel between the stand alone system and the multi-tenant e-mail service provider.

5. The method of claim 4, wherein establishing the secure communication channel comprises performing a transport layer security (TLS) protocol based authentication.

6. The method of claim 1, wherein transmitting the message to the recipient organization with attribution data associated with the message source organization comprises transmitting a Simple Message Transport Protocol (SMTP) command comprising the attribution element to the recipient organization.

7. The method of claim 1, wherein transmitting the message to the recipient organization with attribution data associated with the message source organization comprises adding the attribution element to the message prior to transmitting the message to the recipient organization.

8. The method of claim 1, further comprising:
performing a domain ownership validation of the message source organization.

9. A computer-readable storage device which stores a set of instructions which when executed performs a method for providing trusted e-mail communication, the method executed by the set of instructions comprising:
establishing a trust relationship with a multi-tenant e-mail provider;
notifying the multi-tenant e-mail provider that an attribution element is supported;
receiving an e-mail message from a client tenant of the multi-tenant e-mail provider;
determining whether the e-mail message is associated with the attribution element;
in response to determining that the e-mail message is associated with the attribution element, determining whether the attribution element identifies the client tenant as a trusted sender; and
in response to determining that the attribution element identifies the client tenant as the trusted sender, applying an e-mail handling rule associated with e-mail messages received from trusted senders, the e-mail handling rule allowing a larger attachment size than that allowed for the e-mail messages not received from trusted senders.

10. The computer-readable storage device of claim 9, wherein notifying the multi-tenant e-mail provider that the attribution element is supported comprises advertising support of an attribution data extension in response to an EHLO command transmitted via Simple Message Transport Protocol (SMTP).

11. The computer-readable storage device of claim 9, wherein the attribution element is received as a Simple Message Transport Protocol (SMTP) command.

12. The computer-readable storage device of claim 9, wherein the attribution element is received as at least one of the following: a header associated with the e-mail message, a subset of a body of the e-mail message, and an attachment associated with the e-mail message.

13. The computer-readable storage device of claim 9, wherein applying the e-mail handling rule associated with the e-mail messages received from trusted senders comprises bypassing at least one message analyzer applied to the e-mail messages not received from trusted senders.

14. The computer-readable storage device of claim 9, wherein applying the e-mail handling rule associated with the e-mail messages received from trusted senders comprises applying an appearance formatting to the e-mail message.

15. The computer-readable storage device of claim 9, further comprising:
in response to determining that the attribution element does not identify the client tenant as the trusted sender:
accepting the e-mail message for delivery, and
applying a second e-mail handling rule associated with the e-mail messages not received from trusted senders.

16. The computer-readable storage device of claim 9, further comprising:
in response to determining that the attribution element does not identify the client tenant as the trusted sender, rejecting the e-mail message.

17. The computer-readable storage device of claim 9, further comprising:
in response to determining that the attribution element does not identify the client tenant as the trusted sender:
notifying an administrator of the e-mail message from the non-trusted client tenant, and
temporarily rejecting the e-mail message until a decision whether to deliver the e-mail message is received.

18. A system for providing trusted e-mail communication, the system comprising:
a memory storage; and
a processing unit coupled to the memory storage, wherein the processing unit is operative to:
create a validated communication channel with a source organization, wherein being operative to create the validated communication channel comprises being operative to perform a transport layer security (TLS) protocol certificate-based authentication,
receive an e-mail message from the source organization, wherein the source organization comprises a tenant of a multi-tenant e-mail service provider,
determine whether the e-mail message is associated with an attribution data element, wherein the attribution data element comprises at least one of the following: a Simple Message Transport Protocol (SMTP) parameter, an SMTP command, a header associated with the e-mail message, a subset of a body of the e-mail message, and an attachment associated with the e-mail message,
in response to determining that the e-mail message is associated with an attribution data element, determine whether the attribution data element identifies a trusted source organization, in response to determining that the attribution data element identifies a trusted source organization, apply at least one first message handling rule prior to delivering the e-mail message, and in response to determining that the attribution data element does not identify a trusted source organization, apply at least one second message handling rule prior to delivering the e-mail message.

19. The system of claim 18, wherein applying an e-mail handling rule associated with e-mail messages received from trusted senders comprises allowing a larger attachment size than that allowed for the e-mail messages not received from trusted senders.

20. The system of claim 18, wherein applying an e-mail handling rule associated with e-mail messages received from trusted senders comprises applying an appearance formatting to the e-mail message.

* * * * *